W. McCord,
Horse Power.
N°11,258.   Patented July 11, 1854.
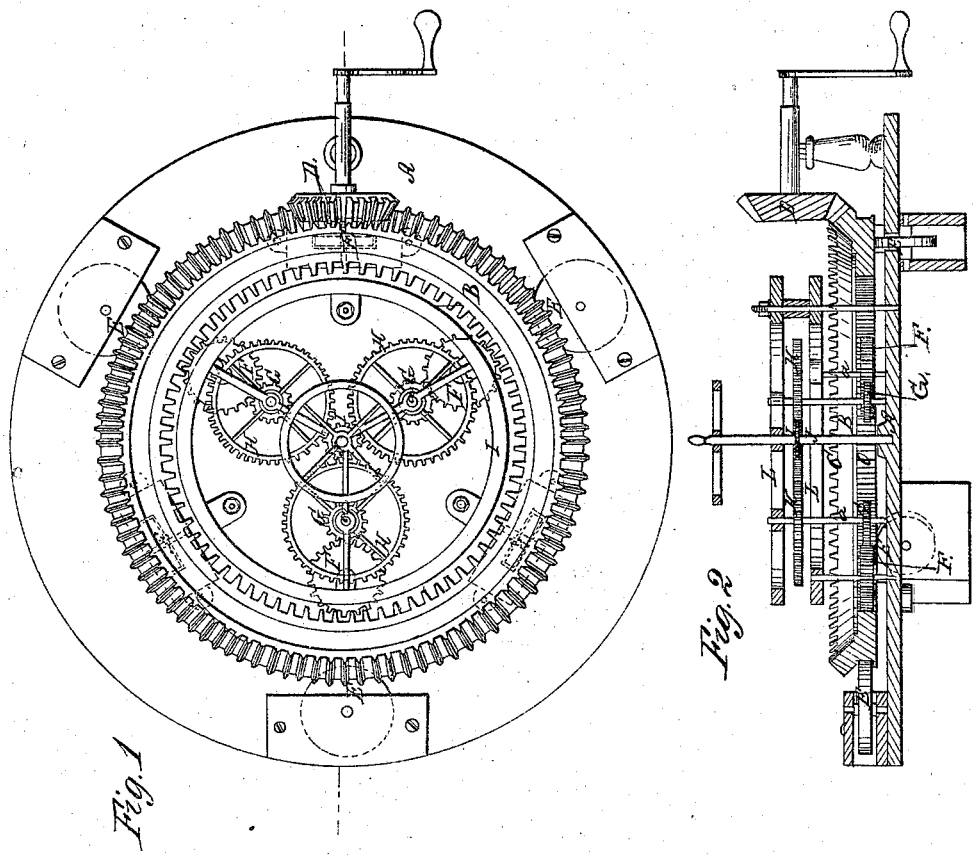

UNITED STATES PATENT OFFICE.

WILLIAM McCORD, OF SING SING, NEW YORK.

HORSE-POWER.

Specification of Letters Patent No. 11,258, dated July 11, 1854.

*To all whom it may concern:*

Be it known that I, WILLIAM McCORD, of Sing Sing, in the county of Westchester and State of New York, have invented a new and useful Improvement in Horse-Powers; and I do hereby declare that the following is a full, clear, and exact description of the same, reference being had to the accompanying drawings, forming part of this specification, in which—

Figure 1, is a plan or top view of my new arrangement of gearing for a horse power. Fig. 2, is a vertical section of the same through the line, *x, x,* in Fig. 1.

Similar letters of reference indicate corresponding parts in both figures.

The nature of my invention consists, in making the internal gear or annular driving wheel without arms, so as to admit of the introduction of intermediate gear, and thereby render the machine more compact, and arranging said wheel upon, and between friction rollers, and making it capable of turning and of serving for transmitting the power directly to the intermediate gearing, and then to the driving shaft. By thus arranging the annular gear wheel, a great reduction in friction is effected, as will be hereinafter shown.

To enable others skilled in the art to make and use my invention, I will proceed to describe its construction and operation.

A, represents the base or frame which supports the working mechanism, it may be made in any suitable manner.

B, represents the annular driving wheel; it is provided with teeth, *o,* on its inner circumference, as shown in the drawing. The lever to which the horse is attached, is secured to the outer periphery of this driver in any convenient way. In the drawing, bevel gearing, C, D, is represented as being used for the purpose of giving motion to the wheel B; but in practice, a lever will be employed instead thereof.

E, E, E, E′, E′, E′, and G, G, G, represent the friction rollers and wheels for keeping the driving wheel, B, in proper position. These rollers and wheels are arranged fast on loose axes under, and round the inner and outer peripheries of the wheel, B, at equal distances apart, in the manner shown in the drawing, and from their arrangement, serve as a rolling axis for the wheel, B, to turn upon, as it is caused to revolve by the movement of the horse. The disposition of the friction rollers and wheels, prevents lateral play and friction any great extent, as grooves are formed in the bottom and around the outer periphery of the wheel, B, for the friction rollers to turn in, and, as the rollers revolve freely when the wheel, B, is in motion. The friction pinions, F, F, F, which match into the internal gear of the wheel, B, serve in connection with the friction rollers for keeping the wheel, B, in place, and also, for transmitting the power from the driver to the intermediate gearing.

G, G, G, are the three smaller pinions than those, F, they are arranged on the shafts, *a, a, a,* inside of the wheel B, and gear into the pinions, F, they serve for transmitting the motion from the wheels, F, to the large pinions, H, H, H, which are arranged on the shafts, *a, a, a,* with the pinions, G, G, G, an gear into the pinion, I, on the central driving shaft, J, as shown in the drawing. The shafts, *a, a, a,* of these wheels are arranged inside of the space formed by making the wheel, B, without arms, and their lower journals turn in the base, A, and their upper journals in the frames, L, L, which are arranged above the frame, A, as shown in Fig. 2. By thus arranging the gearing, a very small space is occupied, and all the speed required can be secured without increase of friction to any great extent.

The operation is as follows: The power is appliedd to the outer periphery of the driver, B, and transmitted by it to the three pinions, F, which match into the inner periphery of B, and revolve freely, as B revolves. The power next passes to the three small pinions, G, on the shafts, *a,* and to the large pinions, H, on the upper ends of said shafts, and then to the pinion, I, on the driving shaft, J.

Horse power constructed after my plan, can be transported from place to place, and properly arranged for use, with great ease and facility.

I claim—

The precise manner herein described and shown, of combining and arranging the parts herein specified, so as to produce an anti-friction horse power.

WM. McCORD.

Witnesses:
O. D. MUNN,
JNO. W. HAMILTON.